United States Patent [19]

Targan

[11] Patent Number: 5,468,491
[45] Date of Patent: Nov. 21, 1995

[54] METHOD FOR PRODUCING OAT EXTRACT

[76] Inventor: Ronald G. Targan, 40 Glenside Rd., South Orange, N.J. 07079

[21] Appl. No.: 179,808

[22] Filed: Jan. 11, 1994

[51] Int. Cl.$^6$ .............................. A61K 31/70; C12C 1/00; A21D 8/04
[52] U.S. Cl. .................. 424/195.1; 127/34; 127/42; 127/43; 127/65; 426/18; 426/20; 426/28; 426/29; 435/93; 435/94; 435/95; 435/96; 435/97; 435/98; 435/99
[58] Field of Search ................. 424/195.1; 435/93–99; 426/18, 20, 28, 29; 127/34, 42, 43, 65

[56] References Cited

U.S. PATENT DOCUMENTS

| | | | |
|---|---|---|---|
| 4,233,406 | 11/1980 | Wieg et al. | 435/275 |
| 4,247,636 | 1/1981 | Schoenrock et al. | 435/94 |
| 4,366,173 | 12/1982 | Parker | 426/20 |
| 4,428,967 | 1/1984 | Goering et al. | 426/28 |
| 4,496,605 | 1/1985 | Targan . | |
| 4,804,545 | 2/1989 | Goering et al. | 426/28 |
| 4,957,565 | 9/1990 | Lehmussaari et al. | 127/68 |
| 4,960,705 | 10/1990 | Johann et al. | 435/272 |
| 5,013,561 | 5/1991 | Goering et al. | 426/28 |
| 5,151,283 | 9/1992 | Foehse et al. | 426/93 |
| 5,169,660 | 12/1992 | Collins et al. | 426/271 |
| 5,190,755 | 3/1993 | Molin et al. | 424/93 J |

OTHER PUBLICATIONS

Palmer et al. *J. Inst. Brew*, vol. 92(5), pp. 461–462, (1986).
Dawkins et al. *Journal of Food Science*, vol. 58(3), pp. 562–566, (1993).
Ahluwalia et al. *J. Inst. Brew*, vol. 90(4), pp. 254–259, (1984).
Ullrich et al. *Journal of Cereal Science*, vol. 4(3), pp. 279–285, (1986).
Gruppen et al. *J. Cereal. Sci.*, vol. 13(3), pp. 279–290, (1991).
Knuckles et al. *Cereal Chemistry*, vol. 69(2), pp. 198–202, (1992).
Bhatty *Cereal Chemistry*, vol. 70(1), pp. 73–77, (1993).

*Primary Examiner*—Douglas W. Robinson
*Assistant Examiner*—Howard C. Lee
*Attorney, Agent, or Firm*—Kenyon & Kenyon

[57] ABSTRACT

Method of producing oat extract from rolled oats and oat flour by performing a series of mixing, cooking, filtering and concentrating steps. The method comprises the steps of mixing rolled white oats with oat flour, bacterial or fungal enzymes, and water to form an oat/enzyme solution. The oat/enzyme solution is then mashed by cooking the solution to convert the starches present in the oats into sugars. The undissolved solids remaining from the rolled oats are separated from the oat mash by filtering the cooked oat mash using some of the undissolved solids as a filter bed. The filtering operation produces oat wort which is then concentrated to produce oat extract.

13 Claims, No Drawings

METHOD FOR PRODUCING OAT EXTRACT

FIELD OF THE INVENTION

The present invention is directed to the production of grain extracts and, more particularly, to a method of producing oat extract.

BACKGROUND OF THE INVENTION

Grain extracts are commonly used as an additive to food products, pharmaceutical preparations and a wide variety of other products as flavor, color, sweeteners and/or texture enhancers.

An extract produced from oats, referred to as oat extract, may be made in either liquid or powder form. In liquid form, oat extract is a fairly viscous, brown liquid that can be readily dissolved in water. Oat extract has a sweetness roughly half that of sugar.

Oat extract has particularly desirable flavoring, coloring, sweetness and moisture retention characteristics that make it particularly well suited for use as an additive to a variety of products including almost any oat or cereal based food product. While the use of oat extract offers the potential to enhance the quality of many products, the production of oat extract has presented several technical as well as commercial problems.

In accordance with the known method of producing oat extract, the oat extract is produced from oat flour that is mixed with water. The solution is then heat treated to convert the starches in the oat flour solution into sugars. After heat treatment, a centrifuge is used to separate the oat extract from the undesired byproducts which remain.

The turbidity, i.e., cloudiness, of the extract produced from the oat flour, the length of time needed to process the extract, and the overall poor yields that result from the use of the known method of producing oat extract are factors that have hindered the known method of producing oat extract from becoming commercially successful.

Accordingly, there is a need for an improved method of oat extract production that will produce an extract having relatively low turbidity, in a reasonable amount of time and in a cost effective manner. Furthermore, in order to be commercially successful, the method of producing oat extract should have a high enough yield to make the resulting extract commercially competitive with other food additives such as malt extract.

SUMMARY OF THE INVENTION

The present invention provides a method for producing oat extract that offers several advantages over the known method of producing oat extract.

In accordance with the present invention, clean, sound oats, e.g., white oats, are first crushed to form rolled oats. The rolled oats are then mixed with oat flour, enzymes and water to form an oat/enzyme grist solution. Next, the oat/enzyme grist solution is mashed by cooking the solution to convert the starches present in the oats into sugars.

The enzymes used in accordance with the present invention may be one or more of many enzymes capable of facilitating the conversion of oat starch into sugar.

In accordance with the present invention, the undissolved solids remaining from the rolled oats after the cooking operation are separated from the oat mash by filtering the cooked oat mash. The filtering operation is performed using a filter vessel wherein some of the undissolved solids remaining from the rolled oats settle to form a filter bed. In accordance with the present invention, the cooked oat/enzyme solution is filtered through the filter bed to produce oat wort which is then concentrated to produce the desired oat extract.

In accordance with the present invention, the use of rolled oats in combination with a filter vessel provide an improved means of separating oat extract from the cooked oat solution when compared to the oat flour and centrifuge arrangement used in the prior art. In particular, the filtration method of the present invention produces oat wort which can be concentrated into oat extract having superior clarity to the oat extract produced in accordance with the known method of oat extract production. Furthermore, the filtration method of the present invention is faster than the centrifugal separation process of the known method of producing oat extract. Thus, the method of the present invention offers production time savings as compared to the known method of producing oat extract.

In addition to the new and novel filtering method for producing oat extract, the use of enzymes in accordance with the present invention and the particular cooking steps recited in various embodiments of the present invention, result in improved yields when compared to the known method of producing oat extract.

Finally, the use of a falling film evaporator to concentrate the oat extract in accordance with one embodiment of the present invention facilitates the production of a higher quality oat extract than normally achieved using a vacuum pan evaporator.

Thus, the method of producing oat extract in accordance with the present invention offers several advantages in terms of reducing production time, increasing yield, and generally producing oat extract having a higher degree of clarity than the oat extract produced using the known method.

DETAILED DESCRIPTION

The present invention is directed to a new and improved method of producing oat extract consisting of a series of crushing, mixing, cooking, filtering and concentrating steps. In accordance with the present invention clean, sound oats, e.g., white oats, are first crushed and then mixed with oat flour, enzymes and water to form an oat/enzyme grist solution. The oat/enzyme grist solution is then mashed by cooking the solution to convert the starches present in the oats into sugars. The cooking operation produces an oat mash containing a substantial amount of undissolved solids. These undissolved solids are separated from the oat mash by filtering the cooked oat mash to produce oat wort which is then concentrated to produce the desired oat extract.

Each of the steps involved in the method of the present invention will now be described in greater detail with reference to an exemplary embodiment.

In accordance with one embodiment of the present invention clean, sound, white oats are first crushed to form rolled oats. The crushing operation may be performed using a standard mill such as a six-roll malt mill manufactured by Buhler-Miag, Inc. Crushing the oats to produce a rolled oat grist of, for example, 95%+60 mesh and 40%+28 mesh should produce satisfactory results.

The next step in the production of oat extract involves a mixing operation. The rolled oats produced by the crushing operation are mixed with oat flour and bacterial or fungal enzymes, suitable for facilitating conversion of oat starches into sugar, to form a crushed oat/enzyme grist. This grist is then mixed with water to form an oat/enzyme solution. The enzymes may be, for example, Novozyme OS and/or Beta-glucanase.

As will be described further below, the use of rolled or crushed oats as opposed to merely oat flour facilitates subsequent filtering operations. Furthermore, the inclusion of enzymes facilitates the conversion of starches into sugar during subsequent cooking operations. Accordingly, through the use of enzymes the cooking time needed to convert the oat starches into sugar can be reduced and/or a higher degree of starch to sugar conversion can be achieved than would be possible without the inclusion of such enzymes in the oat solution. In this manner, the use of enzymes offers the advantages of reducing the required cooking time while potentially increasing the final yield that can be achieved from a fixed amount of rolled oats and oat flour.

It should be noted that the method of the present invention can be implemented without the use of enzymes to facilitate the conversion of oat starch into sugar. However, in such an embodiment, cooking time must generally be increased and overall yield may be decreased as a result of the failure to use enzymes in the oat solution.

A preferred ratio of rolled oats to oat flour to enzymes is 15 kg rolled oats to 1.67 kg of oat flour to 1 kg of enzymes (15:1.67:1). Mixing this oat/enzyme grist with water at a ratio of 1.9 liters of water to each kg of oat/enzyme grist provides satisfactory results. While the above rolled oats/oat flour/enzyme mixture ratios and oat/enzyme grist to water ratios have been found to produce satisfactory results, the above ratios are merely exemplary of a wide variety of mixture ratios that may be used with the method of the present invention.

Once the crushing and mixing steps have been performed to produce the oat/enzyme solution, the next step in producing the oat extract involves cooking, e.g., mashing, the oat/enzyme solution to convert the oat starches into sugar. It has been found that by increasing the cooking temperature of the oat/enzyme solution at various stages during the cooking process, more complete starch to sugar conversion is achieved than when the oat/enzyme solution is cooked at a single constant temperature.

The oat/enzyme solution is next heated to a first temperature of approximately 50 degrees celsius and cooked at this temperature for approximately 3 hours. At the end of this first cooking period, the oat/enzyme solution is heated to a temperature of approximately 65 degrees celsius and cooked at this temperature for approximately two and one half hours. To insure even distribution of the rolled oats, oat flour, and enzymes throughout the oat/enzyme solution and to facilitate even heating of the oat/enzyme solution during the cooking process, the oat/enzyme may be agitated throughout all or portions of the cooking operation.

After cooking the oat/enzyme solution for approximately five and one-half hours as described above, the cooked oat/enzyme solution is further heated to approximately 78 degrees in preparation for adjusting the pH of the solution and for filtering.

Upon heating the cooked oat/enzyme solution to approximately 78 degrees celsius, the pH of the solution is adjusted to raise the pH. This lowering of the solutions acidity is achieved by, e.g., adding sodium hydrogen sulphate to the cooked oat/enzyme solution to achieve a solution pH of approximately 5.8. This adjustment of the pH assists in the subsequent filtration process.

After adjusting the pH of the cooked oat/enzyme solution to produce a pH adjusted oat mash, the pH adjusted oat mash is transferred to a filtration vessel while maintaining the temperature of the pH adjusted oat mash at approximately 78 degree celsius.

The filter vessel may be a lauter tun or other suitable filter vessel wherein the non-soluble solids remaining from the rolled oats can settle and act as a filter bed through which the remaining pH adjusted oat mash can be filtered to produce an oat wort. By using the rolled oats as a filter bed, improvements in oat extract clarity and separation time are achieved as compared to the known method of oat extract production which uses a centrifuge to separate the solids from the oat extract being produced from oat flour. Accordingly, the use of rolled oats in combination with a filtration vessel permits oat extract with greater clarity to be produced in less time then is possible with the known method of producing oat extract.

After filtration, the only remaining step in the oat extract production process is concentration. In accordance with this step, the oat wort, i.e., oat-sugar extract solution produced by the filtration step is concentrated to produce oat extract in the form of a viscous syrup. In another embodiment, the oat wort may be concentrated to produce a dry powder form of the oat extract.

The oat wort is concentrated using a falling film evaporator which provides superior results in terms of the quality of the resulting oat extract, in terms of both flavor and color. This is compared to results obtained by using a vacuum pan device to concentrate the oat wort. Because of the superior heat transfer characteristics of the falling film evaporator, excess darkening and/or burning that would otherwise result from the use of a vacuum pan device is eliminated. This permits the production of oat extract in lighter shades of brown than would otherwise be possible. Furthermore, oat extract can be produced without a burnt or bitter taste that can result from the use of a vacuum pan device to concentrate the oat wort. Accordingly, in the embodiment of the present invention above described, the oat wort produced as a result of the filtration process is concentrated into a viscous syrup comprising approximately 80% sugars and 20% water through the use of a falling film evaporator.

The concentrated oat extract, in the form of a syrup produced by the above process, may be of virtually any color shade of brown. The particular shade of brown of the oat extract produced is a function of the cooking times and temperatures used to produce the oat extract. Accordingly, by varying the cooking times and temperatures during the oat extract production process of the present invention, an oat extract having a shade of almost any color brown can be produced.

I claim:

1. A method of producing oat extract, consisting essentially of the steps:

(a) combining rolled oats, oat flour, and enzymes for facilitating the conversion of starch into sugar, in a ratio of approximately 15 kg rolled oats to 1.67 kg oat flour to 1 kg of enzymes, to form an oat/enzyme grist;

(b) mixing the oat/enzyme grist with water, in a ratio of approximately 1 kg of oat/enzyme grist to 1.9 liters of water, to form an oat/enzyme solution;

(c) heating the oat/enzyme solution to a temperature of approximately 50 degrees celsius;

(d) maintaining the temperature of the oat/enzyme solution at approximately 50 degrees celsius for about three hours;

(e) heating the oat/enzyme solution from approximately 50 degrees celsius to approximately 65 degrees celsius; and (f) maintaining the temperature of the oat/enzyme solution at about 65 degrees celsius for approximately 2.5 hours;

(g) agitating the mixture of the oat/enzyme solution during steps (d), (e), and (f);

(h) adjusting the pH of the oat/enzyme solution to approximately a pH of 5.8;

(i) transferring the pH adjusted oat/enzyme solution to a filtration vessel;

(j) separating undissolved solids from the pH adjusted oat/enzyme solution to produce filtered oat wort by passing the pH adjusted oat/enzyme solution through a filter contained in the filtration vessel; and (k) concentrating the filtered oat wort to produce oat extract.

2. The method of claim 1, wherein the step of concentrating the filtered oat wort in step (k) is accomplished by (i) operating a falling film evaporator to concentrate the heated and filtered oat wort into oat extract.

3. A method of producing oat extract, consisting essentially of the steps:

(a) combining rolled oats, oat flour, and enzymes capable of facilitating the conversion of starch into sugar, to form an oat/enzyme grist;

(b) mixing the oat/enzyme grist with water to form an oat/enzyme solution;

(c) cooking the oat/enzyme solution to convert oat starch present in the oat/enzyme solution into sugar;

(d) transferring the cooked oat/enzyme solution to a filtration vessel and allowing at least a portion of the non-soluble solids remaining from the rolled oats to settle to form a filtration bed; and (e) separating undissolved solids from the cooked oat/enzyme solution by filtering the cooked oat/enzyme solution through the filtration bed formed within the filtration vessel to produce filtered oat wort.

4. A method for producing oat extract consisting essentially of the steps:

(a) combining rolled oats, oat flour, and enzymes capable of facilitating the conversion of starch into sugar, to form an oat/enzyme grist;

(b) mixing the oat/enzyme grist with water to form an oat enzyme solution;

(c) cooking the oat/enzyme solution to convert oat starch present in the oat/enzyme solution into sugar;

(d) transferring the cooked oat/enzyme solution to a vessel and allowing at least a portion of the non-soluble solids remaining from the rolled oats to settle to form a filtration bed;

(e) separating undissolved solids from the cooked oat/enzyme solution by filtering the cooked oat/enzyme solution through the filtration bed formed within the filtration vessel to produce filtered oat wort; and (f) concentrating the filtered oat wort to produce oat extract.

5. The method of claim 4, wherein the cooking in step (c) is performed by:

(i) heating the oat/enzyme solution to a temperature of approximately 50 degrees celsius;

(ii) maintaining the temperature of the oat/enzyme solution at approximately 50 degrees celsius for about three hours;

(iii) heating the oat/enzyme solution from approximately 50 degrees celsius to approximately 65 degrees celsius; and (iv) maintaining the temperature of the oat/enzyme solution at about 65 degrees celsius for approximately 2.5 hours.

6. The method of claim 5, wherein the combining of rolled oats, oat flour, and enzymes to form oat/enzyme grist in step (a) is performed by combining rolled oats, oat flour, and enzymes in a ratio of approximately 15 kg of rolled oats to 1.67 kg of oat flour to 1 kg of enzymes.

7. The method of claim 6, wherein the mixing in step (b) is performed by mixing the oat/enzyme grist with water in a ratio of 1 kg of oat/enzyme grist to 1.9 liters of water.

8. The method of claim 7, wherein the cooking in step (c) is performed by heating the oat/enzyme solution from approximately 65 degrees celsius to approximately 78 degrees celsius prior to transferring the cooked oat/enzyme solution to the filtration vessel.

9. The method of claim 8, wherein the pH of the cooked oat/enzyme solution is adjusted to approximately 5.8 after heating the oat/enzyme solution to approximately 78 degrees celsius.

10. The method of claim 8, wherein the concentrating in step (f) uses a falling film evaporator to concentrate the filtered oat wort.

11. The method of claim 10, where the filtered oat wort is heated to a temperature of 80 degrees celsius prior to performing the step of concentrating the filtered oat wort.

12. The method of claim 11, wherein the step of adjusting the pH of the cooked oat/enzyme solution is performed by adding Sodium Hydrogen Sulphate to the cooked oat/enzyme solution.

13. A method of producing oat extract, the method consisting essentially of the steps:

(a) crushing oats to a grist of approximately 95%+60 mesh;

(b) combining the crushed oats, oat flour, and bacterial or fungal enzymes for facilitating the conversion of starch into sugar, in a ratio of approximately 15 kg rolled oats to 1.67 kg oat flour to 1 kg of enzymes, to form an oat/enzyme grist;

(c) mixing the oat/enzyme grist with water, in a ratio of approximately 1 kg of oat/enzyme grist to 1.9 liters of water, to form an oat/enzyme solution;

(d) heating the oat/enzyme solution to a temperature of approximately 50 degrees celsius;

(e) maintaining the temperature of the oat/enzyme solution at approximately 50 degrees celsius for about three hours;

(f) heating the oat/enzyme solution from approximately 50 degrees celsius to approximately 65 degrees celsius; and (g) maintaining the temperature of the oat/enzyme solution at about 65 degrees celsius for approximately 2.5 hours;

(h) agitating the mixture of the oat/enzyme solution during steps (d), (e), and (f);

(i) adjusting the pH of the oat/enzyme solution to approximately a pH of 5.8;

(j) transferring the pH adjusted oat/enzyme solution to a filtration vessel;

(k) separating undissolved solids from the pH adjusted oat/enzyme solution to produce filtered oat wort by passing the pH adjusted oat/enzyme solution through a filter contained in the filtration vessel; and (l) concentrating the filtered oat wort to produce oat extract.

* * * * *